United States Patent [19]

Jarvis

[11] Patent Number: 4,607,474
[45] Date of Patent: Aug. 26, 1986

[54] SORTING ARTICLES FROM BULK
[75] Inventor: Sidney H. Jarvis, London, England
[73] Assignee: LRC Products Limited, London, England
[21] Appl. No.: 777,258
[22] Filed: Sep. 18, 1985
[30] Foreign Application Priority Data Sep. 21, 1984 [GB] United Kingdom ................ 8423940

[51] Int. Cl.⁴ ............................................ B65B 63/04
[52] U.S. Cl. ........................................ 53/117; 29/235
[58] Field of Search ...................... 53/116, 117, 118; 29/235

[56] References Cited

U.S. PATENT DOCUMENTS 3,588,997 6/1971 Field ................................ 29/235 X
3,992,766 11/1976 Field .................................. 29/235
4,529,396 7/1985 Bell .................................... 53/117

Primary Examiner—John Sipos
Attorney, Agent, or Firm—Watson, Cole, Grindle & Watson

[57] ABSTRACT

An apparatus for sorting and preparing condoms for packing comprises a hopper (1) for receiving a bulk supply of condoms and through which an upwardly directed pulsed flow of air is directed to orientate the condoms in upright positions and to cause individual condoms to enter dispensing units (2) which control delivery of the condoms to vacuum transfer tubes (3) through which the condoms are conveyed to respective roll-up mechanisms (4). Each roll-up mechanism (4) includes a plurality of roll-up devices (39) carried on a turntable (38) to be moved in turn to the loading station aligned with the outlet of the transfer tube (3). Each condom is delivered directly onto a roll-up device, being turned inside out as it passes down over the roll-up device which has two rods (40) arranged to become spread apart for rolling-up the condom.

12 Claims, 7 Drawing Figures

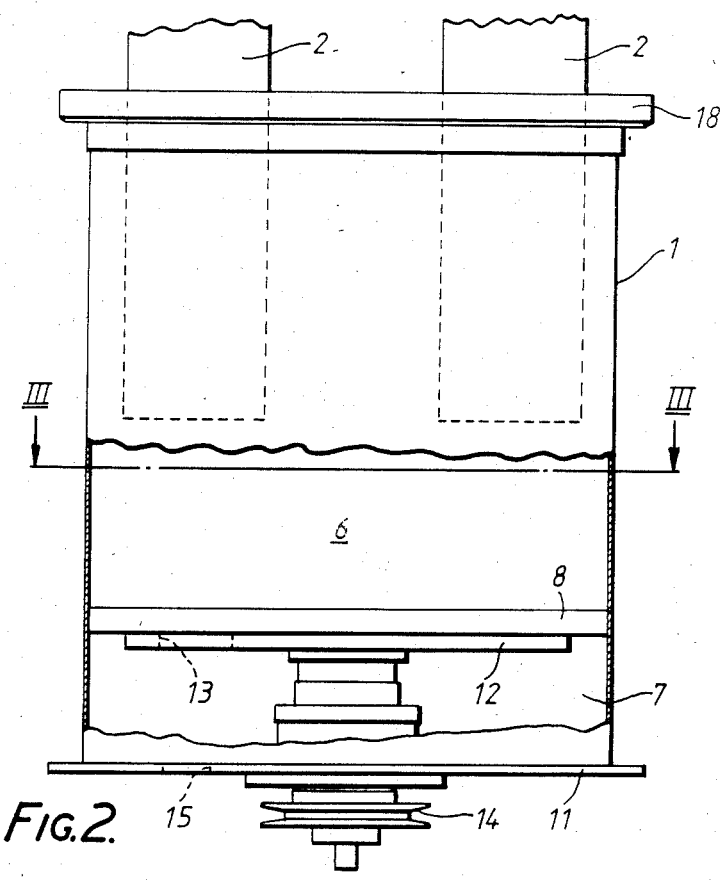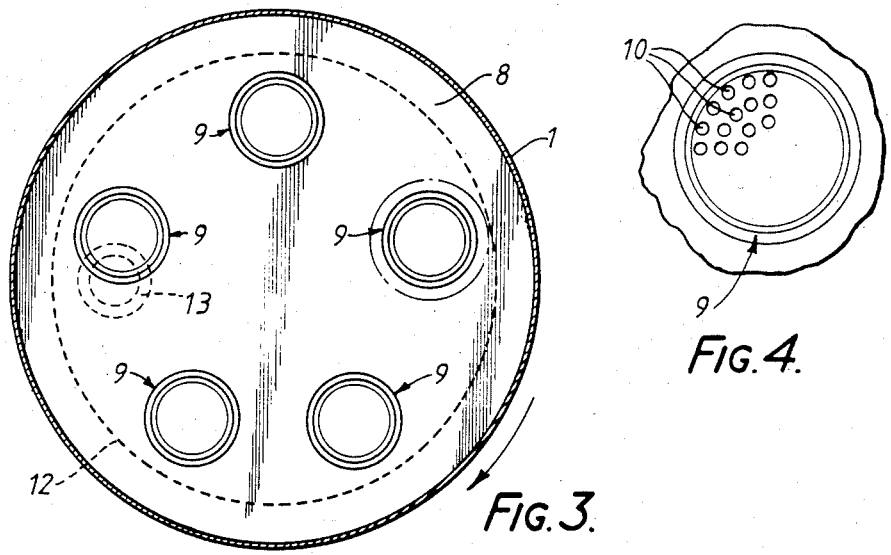

SORTING ARTICLES FROM BULK

This invention relates to an apparatus for sorting and preparing for packaging contraceptive sheaths or condoms.

Conventionally condoms are manufactured by a dip moulding process. After stripping the moulded products from the formers on which they are made they are normally gathered together in bulk and it then becomes necessary to separate individual condoms and roll them up ready for packaging. The apparatus disclosed herein enables the separation and rolling-up of individual condoms to be performed automatically in a convenient manner and at an improved rate.

In accordance with the invention there is provided an apparatus for sorting and preparing condoms for packaging, comprising a device for separating individual condoms from a bulk supply of condoms, a roll-up device for receiving a separated condom and rolling-up the condom ready for packaging, and pneumatic conveying means for transferring a separated condom from the separating device to the roll-up device, the pneumatic conveying means delivering the condom directly to the roll-up device ready to be rolled-up thereby.

The use of pneumatic conveying means enables the condoms to be transferred rapidly and reliably to the roll-up device ready to be rolled-up. The conveying means preferably comprises a transfer tube and an injector nozzle located at the outlet end of the tube for drawing air through the tube so that the condom is conveyed along the tube under vacuum pressure. The condom travels along the tube closed end first and is ejected from the tube at sufficient speed for it to become turned inside out over a roll-up device aligned with the tube outlet. In order to increase through-put it is expedient for a plurality of roll-up devices to be provided for receiving successive condoms conveyed through the transfer tube. The roll-up devices are conveniently carried on a turntable equipped with an indexing drive for moving the roll-up devices in turn to a loading station aligned with the outlet of the conveying tube.

An especially simple and convenient form of roll-up device comprises a plurality of elongate elements which are adjustable from a folded position in which they are substantially parallel for receiving the condom, and an expanded position in which they are spread apart and converge towards their free ends, the condom being rolled-up automatically as the elements are expanded apart. The elements are conveniently actuated to expand by engagement with a stationary stop as the roll-up device is moved away from the loading station.

The separating device preferably includes dispensing means for delivering separated condoms to the pneumatic conveying means at a controlled rate. This facilitates the delivery of condoms to be synchronised with the operation of the roll-up mechanism. In the preferred embodiment the dispensing means comprises a duct with vacuum ports for retaining a condom in the duct, and releasing the condom when a burst of pressurised air is fed to the ports. The burst of air is also supplied to nozzles located adjacent the inlet of the duct for directing air in opposite directions through the duct to expel the released condom and prevent another condom entering the duct until the first condom has been discharged.

The condoms can be conveniently separated in a device comprising a chamber for receiving the bulk supply of condoms, and means for producing an upwardly directed pulsed flow of gas through the chamber whereby the condoms orientate themselves in a generally upright position and individual orientated condoms can move upwardly into the dispensing means. It is possible for a plurality of dispensing units to receive condoms from the separating chamber for delivering the condoms to respective roll-up mechanisms via respective pneumatic conveyor tubes.

To assist a full understanding of the invention an apparatus for separating condoms from bulk and rolling them up ready for packaging, and the operation of the apparatus, will now be described in detail with reference to the accompanying drawings, in which:

FIG. 2 is a side view, shown partly in section, of the separation chamber of the apparatus;

FIG. 3 is a section taken along the line III—III of FIG. 2;

FIG. 4 shows one of the air inlets of the separation chamber;

Figure 1:
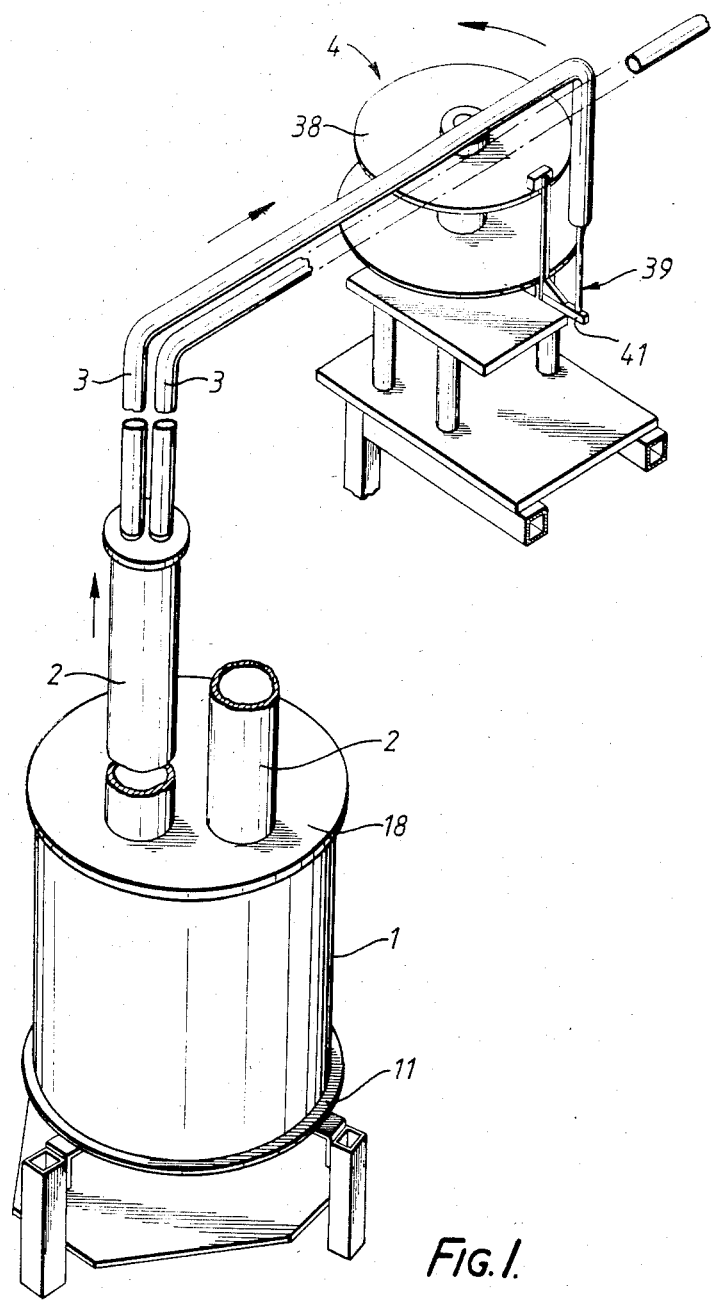
FIG. 1 is an overall perspective view illustrating the apparatus.

Referring initially to FIG. 1, the apparatus comprises a hopper 1 for receiving the bulk condoms. Individual condoms separated from the bulk and oriented in upright positions with their open ends lowermost enter discharge tubes 2 to be delivered at a controlled rate into transfer tubes 3 for conveying the products to the roll-up mechanisms 4. As shown each discharge tube includes two dispensing units, and each dispensing unit delivers condoms into a respective transport tube 3 for conveyance to a respective roll-up mechanism, only one of which has been included in the drawing for the sake of clarity.

The bulk hopper 1 as shown in more detail in FIGS. 2-4. It is divided internally into an upper separation chamber 6 and a lower chamber 7 by a horizontal, rotatable partition wall 8. The wall 8 has a series of five air inlets 9 uniformly spaced apart around the chamber axis, each inlet being defined by a large number of small holes 10 to prevent condoms faling down through the inlets. A pair of relatively rotatable coaxial vertical shafts are journalled in the bottom end wall 11 of the hopper, the inner shaft being fast with the wall 8 and the outer shaft carrying a rotatable disc 12. The disc is located immediately below the wall 8 and includes a single orifice 13 having its centre located at the same radial distance from the hopper axis as the inlets 9, whereby rotation of the disc 12 relative to the wall 8 brings the orifice into register with the inlets in turn. Outside the hopper a pulley 14 is fast with the shaft carrying the disc 12 for rotating the disc by means of a suitable drive. A blower unit (not shown) is connected to the hopper through an opening 15 in the bottom wall 11 for supplying air under pressure to the lower chamber 7. As the disc 12 is rotated pulses of air are directed upwardly through the separation chamber via the inlets 9 and cause individual condoms to orientate themselves in an upright position and separate from the bulk. The wall 8 is rotated slowly, compared with the speed of the disc 12, by means of a motor (not shown) coupled to the shaft fast with this wall, so that the positions at which the pulses of air are directed up through the chamber 6 is continuously varied.

Figure 5:
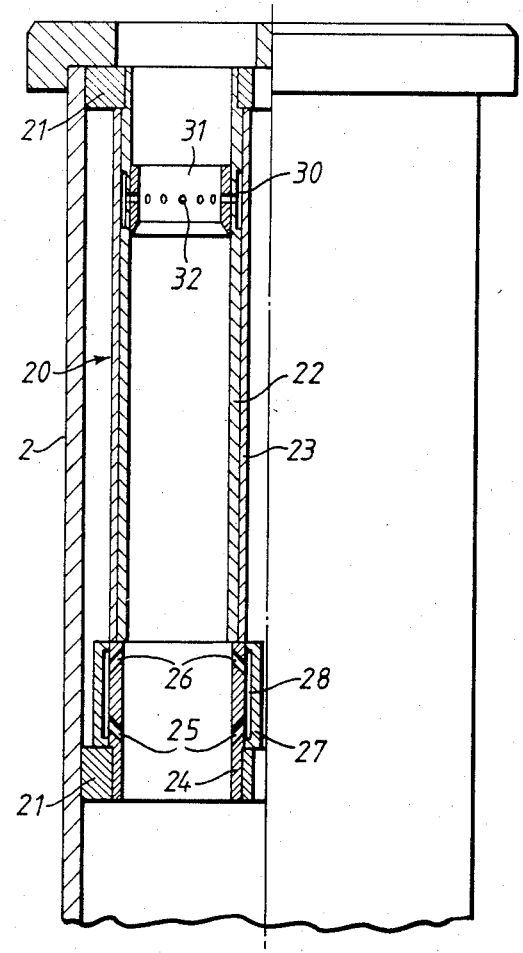
FIG. 5 is a detail view showing in axial section a dispensing unit of the separation chamber.

Mounted on the top wall 18 of the hopper is a plurality of discharge tubes 2, there being two in the embodiment illustrated. The tubes 2 project down into the separation chamber 6 for receiving individual condoms separated from the bulk and oriented in an upright position. Each tube 2 accommodates two dispensing units 20 adjacent its upper end. One of the dispensing units is illustrated in detail in FIG. 5. It comprises an assembly of tubes defining a delivery duct and mounted in the discharge tube by supports 21. The tube assembly includes a delivery tube 22 located within an outer tube 23 and a distributor tube 24 located below the tubes 22, 23 and having two sets of air nozzles, namely a lower set 25 arranged for directing a burst of air down through the lower end portion of the delivery duct, and an upper set 26 arranged for directing a burst of air up through the delivery duct, for reasons which will become clear. A collar 27 surrounds the distribution tube 24 and defines with it an annular air passage 28 for supplying air to the nozzles 25, 26, the passage 28 being connected to an air supply through a connection on the collar which is not shown. Defined between the tubes 22, 23 adjacent the upper end of the delivery duct is an annular passageway 30 which is connected to a vacuum source by a connection (not shown) provided on the outer tube 23. Fixed in the delivery tube at the same level as the passageway 30 is a sleeve 31, and a row of vacuum ports 32 are drilled through the sleeve 31 and the delivery tube 22 to communicate the delivery duct with the passageway 30. When a condom separated from the bulk in the hopper 1 floats up into the delivery duct of the dispensing unit under the influence of the air pulses directed up through the separation chamber 6, upon reaching the ports 32 it becomes held by the vacuum and does not rise any further. The delivery duct has a diameter slightly greater than that of the condoms and the sleeve 31 provides a constriction to ensure that the condoms will be held reliably by the vacuum. To deliver a condom from the dispensing unit a blast of air is conducted to the passageway 30 to cancel the vacuum for a short time and thereby release the condom. The blast of air is fed simultaneously to the passage 28 for the pulse of air ejected through the upper nozzles 26 to drive the condom out through the upper end of the delivery tube while the pulse of air ejected through the lower nozzles 25 prevents a further condom waiting to enter the delivery duct from doing so until the dispensing unit is ready to receive it.

Figure 6:
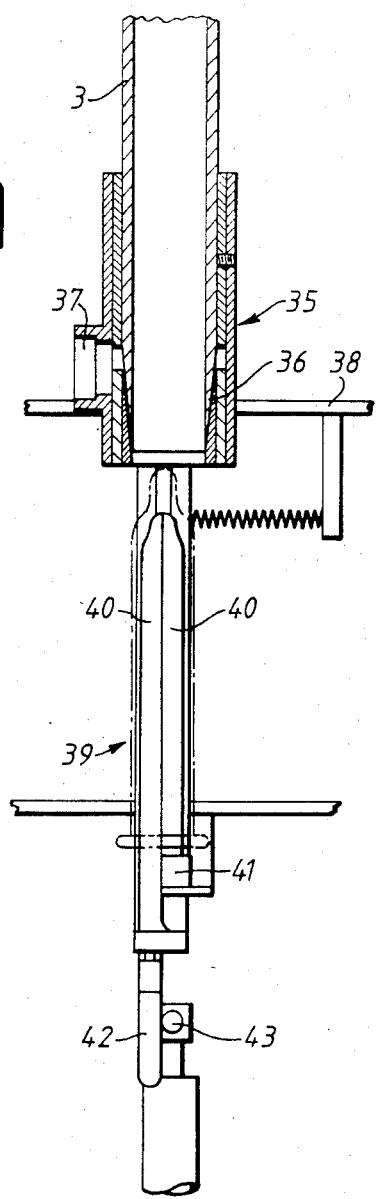
FIG. 6 is a side view of a roll-up device and showing in section the outlet end of the product transfer tube.

The condom delivered from the dispensing unit passes out through an opening in a closure cap of the discharge tube 2 and enters the inlet end of a transfer tube 3, the end of the transport tube being coaxially aligned with the delivery duct and located at a small distance from the top of the discharge tube. The condom is conveyed rapidly through the transfer tube by vacuum which is applied by an injector device 35 fitted to the outlet end of the tube, as shown in FIG. 6. The injector device defines with the end of the transfer tube a conical venturi nozzle 36 to which compressed air is supplied through an inlet port 37. In well known manner the flow of air through the nozzle creates suction at the end of the transfer tube for drawing air through the tube to carry the condom with it. The transfer tube transports the separated condom to the roll-up mechanism 4.

Figure 7:
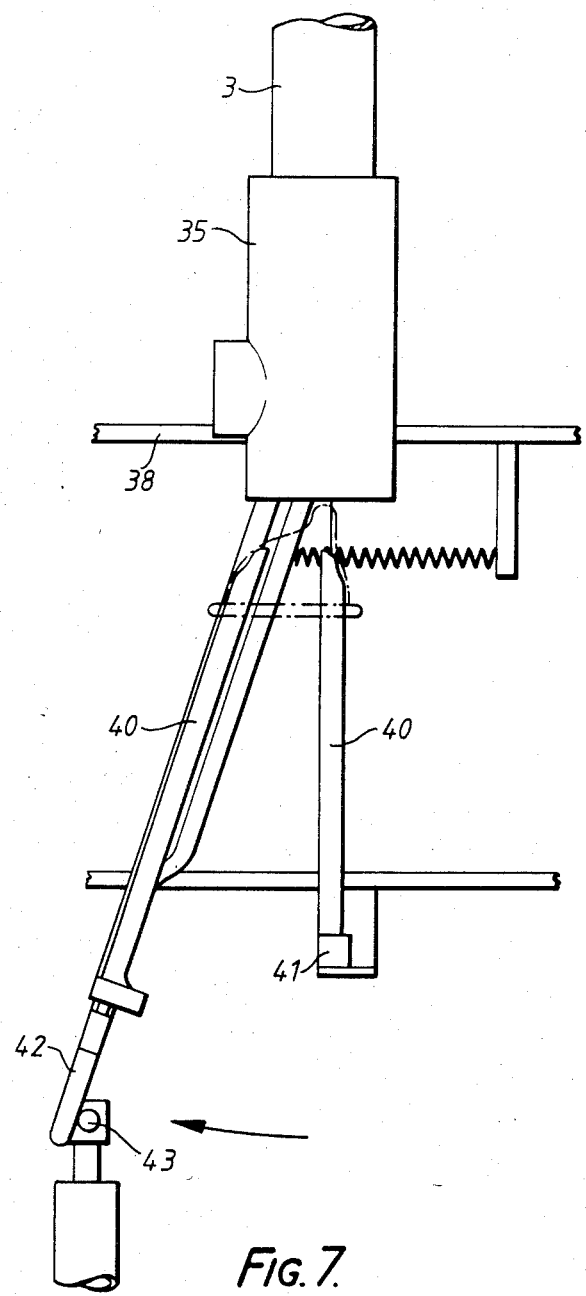
FIG. 7 is a similar view to FIG. 6 showing the roll-up device in an actuated condition.

The roll-up mechanism comprises a turntable 38 carrying a plurality, e.g. four, roll-up devices 39 uniformly distributed around its periphery, and a drive for indexing the turntable around to bring the roll-up devices in turn to a loading station located at the outlet end of the transfer tube 3. Each roll-up device 39 comprises a pair of rods 40 which combine to form an upstanding post which is aligned axially with the outlet end of the transfer tube at the loading station. The rods 40 are connected to the turntable 38 by respective L-shaped brackets 41 which are pivoted to each other at their upper ends. One bracket 41 is fixed on the turntable but the other, which carries the trailing rod in the direction of rotation of the turntable 38, is free to pivot in the manner indicated in FIG. 7.

A condom travelling through the transfer tube 3, upon reaching the outlet end, impinges with its leading closed end against the upper end of the post formed by the rods 40. Due to the speed of the condom and the effect of the air flowing through the injector nozzle, the open end of the condom continues to move down over the post with the condom turning itself inside out as it does so, and the condom thus reaches the position in which it is outlined in FIG. 6. When the turntable is advanced during the next indexing step a finger 42 projecting down from the movable bracket 41 runs up against a stationary stop 43 whereby the rods 40 become spread apart, and converge towards their upper ends as seen in FIG. 6. This spreading of the rods causes the condom to roll-up from its lower open end to the position indicated in FIG. 7. Eventually the finger 42 rides over the stop 43, and the rods return to their closed position. The rolled-up condom may then be removed, e.g. by blowing it from the top of the post with a pulse of compressed air into an appropriately positioned collecting container.

The operation of the apparatus at the various stages has been described, but the manner in which the operations are synchronised will now be explained.

The vertically oriented and separated condoms rise into the discharge tubes 2 from the separation chamber 6. When the blast of air to the passages 28 and 31 of the dispensing unit 20 has subsided, a condom is free to float up into the delivery duct where it is held by the vacuum applied at the ports 32. When a roll-up device has been moved into the loading station ready to receive the condom a blast of air is transmitted to the passages 28, 31 for the condom to be delivered from the dispensing unit into the transfer tube 3. The condom is conveyed through the tube and loaded on to the waiting roll-up device. The turntable is then turned through one indexing step, i.e. ¼ revolution, whereby the condom becomes rolled up and the following roll-up device becomes positioned at the loading station ready to receive the next condom. The operational cycle is then repeated.

It will be appreciated that each dispensing unit, associated transfer tube and roll-up mechanism functions in the same way, and the number of such combinations may be selected in accordance with the desired sorting speed. Other modifications are also possible without departing from the scope of the invention as defined by the following claims.

I claim:

1. An apparatus for sorting and preparing condoms for packaging, comprising a device for separating individual condoms from a bulk supply of condoms, a roll-up device for receiving a separated condom and rolling-up the condom ready for packaging, and pneumatic conveying means for transferring a separated condom from the separating device to the roll-up device, the pneumatic conveying means delivering the condom directly to the roll-up device ready to be rolled-up thereby;

wherein the conveying means has an outlet through which the condom is delivered closed end first, and the rolling-up device is aligned with said outlet at a loading station, the conveying means being arranged to deliver the condom onto the roll-up device at a sufficient speed for the condom to become turned inside out over the roll-up device;

wherein the roll-up device comprises a plurality of elongated elements coupled for relative movement between a first position in which said elements are substantially parallel for receiving a condom delivered over one end thereof, and an expanded position in which the elements are spread apart and converge towards said one end, whereby movement of the elements from the first position to the second position causes a condom received thereon to become rolled-up towards said end.

2. An apparatus according to claim 1, wherein the pneumatic conveying means comprises a transfer tube and means for drawing air through the tube for the condom to be conveyed through the tube by vacuum pressure.

3. An apparatus according to claim 1, wherein the means for drawing air through the transfer tube comprises an injector nozzle and means for supplying air under pressure to said nozzle.

4. An apparatus according to claim 1, wherein said roll-up device is mounted for movement into and away from said loading station, and stationary stop means is provided to expand said elements from the first position to the second position as the roll-up device is moved away from the loading station.

5. An apparatus according to claim 1, wherein a plurality of roll-up devices are carried on a turntable and indexing means is provided for driving the turntable for moving the roll-up devices in turn to the loading station.

6. An apparatus according to claim 1, wherein the separating device includes dispensing means for delivering separated condoms to the pneumatic conveying means at a controlled rate.

7. An apparatus according to claim 6, wherein the dispensing means comprises a duct having an inlet end and an outlet end, and means for retaining a condom in the duct and releasing the condom for discharge through the outlet end of the duct in response to a dispense signal.

8. An apparatus according to claim 7, wherein the retaining means comprises a plurality of vacuum ports in the wall of the duct and means for interrupting the vacuum supplied to said ports to release a condom in the duct.

9. An apparatus according to claim 8, wherein air nozzles are provided in the duct adjacent the inlet end thereof and are arranged to direct bursts of air supplied thereto in opposite directions through the duct for driving a condom out through the outlet end of the duct and for preventing another condom entering the inlet end of the duct until the first condom has been discharged.

10. An apparatus according to claim 9, wherein means for conducting bursts of air to said nozzles is arranged to supply a burst of air to the vacuum ports at the same time for cancelling the vacuum to release the condom.

11. An apparatus according to claim 6, wherein the separating device comprises a chamber for receiving the bulk supply of condoms, and means for producing an upwardly directly pulsed flow of gas through the chamber thereby to cause condoms to orientate themselves in a generally upright position and individual oriented condoms to move upwardly into the dispensing means.

12. An apparatus according to claim 11, wherein a plurality of dispensing units are provided for receiving condoms from the separating chamber and for delivering the condoms to respective pneumatic conveyor tubes, the conveyor tubes being arranged to transfer the condoms to respective roll-up mechanisms.

* * * * *